UNITED STATES PATENT OFFICE 2,380,620

PRODUCTION OF ALKALI METAL PERCARBONATES

Oswald Hugh Walters, Runcorn, England, assignor to Imperial Chemical Industries Limited, a corporation of Great Britain No Drawing. Application March 17, 1944, Serial No. 526,851. In Great Britain April 23, 1943

20 Claims. (Cl. 23—62)

This invention relates to improvements in the production of inorganic compounds, and more particularly to the production of alkali metal percarbonates.

It is known that alkali metal percarbonates can be obtained by reacting an alkali metal carbonate or bicarbonate with hydrogen peroxide at low temperatures and salting out the product from the resultant solution, suitably by the addition of the corresponding alkali metal chloride. The precipitated percarbonate is then recovered and dried. Alternatively the carbonate or bicarbonate may be added to a cold solution of the corresponding alkali metal peroxide which has been neutralised with hydrochloric acid of such strength that the solution is almost saturated at reaction temperature with respect to the alkali metal chloride so formed. The percarbonate is thus produced and precipitated simultaneously. Normally a stabiliser such as sodium silicate, a water-soluble magnesium salt such as magnesium sulphate, or gum arabic is added to the reaction liquor to prevent decomposition causing loss of active oxygen. It has also been proposed to use amines to stabilise percarbonates. Nevertheless, some loss of active oxygen does occur both during the production of the percarbonate, and during the drying.

According to the present invention there is provided a process for the production of an alkali metal percarbonate which includes the steps of interacting in cold aqueous solution hydrogen peroxide and an alkali metal carbonate or bicarbonate so as to form the said percarbonate and causing said percarbonate to be precipitated from the solution, which precipitation is carried out in the presence of a small proportion of diphenyl guanidine. Advantageously the solution from which the alkali metal percarbonate is precipitated also contains a known stabiliser for alkali metal percarbonates.

By carrying out the precipitation in the presence of diphenyl guanidine a smaller loss of active oxygen occurs than would otherwise be the case. The use of diphenyl guanidine does not, however, render the use of other stabilisers superfluous, for a still smaller loss of active oxygen results during the process if diphenyl guanidine is used in addition to one or more of such stabilisers. The advantage which results from the use of diphenyl guanidine according to the invention is particularly marked during the drying stage, when a substantial loss in active oxygen is liable to occur.

Quite valuable diminution in the active oxygen loss can be achieved using amounts of diphenyl guanidine of the order of 20 to 60 parts per million calculated on the percarbonate which could theoretically be produced. Thus 40 parts per million may be employed. However, smaller or larger amounts may be used if desired, say amounts as low as 10 parts per million, or as high as 400 parts per million. Known stabilisers such as sodium silicate, soluble magnesium salts, such as magnesium sulphate, or gum arabic, should be present in the amounts in which they are normally employed in the production of alkali metal percarbonates from hydrogen peroxide and alkali metal carbonates or bicarbonates. Thus in the case of sodium silicate between 1% and 5%, e. g. 2% may be used, calculated on the weight of the percarbonate which could theoretically be produced.

The invention is particularly useful as applied to the production of sodium percarbonate from hydrogen peroxide and sodium carbonate or bicarbonate, either by adding the salt to aqueous hydrogen peroxide and subsequently salting out the percarbonate by adding sodium chloride so as to saturate the solution, or by adding the sodium carbonate or bicarbonate to a solution of sodium peroxide neutralised with hydrochloric acid of such strength that the solution is almost saturated with respect to sodium chloride at reaction temperature.

The process is carried out in the cold, i. e. at temperatures below or not greatly in excess of atmospheric temperature; thus temperatures somewhat below atmospheric may be used, e. g. temperatures of 10° C. to 15° C., a brine circulating system or other cooling means being employed to regulate the temperature. Even if temperatures slightly above atmospheric, e. g. 20° C. to 25° C., are permitted cooling means will in general be needed to remove the heat generated by the reaction.

In one method of carrying out the invention the hydrogen peroxide is added to a concentrated solution of the sodium carbonate containing, e. g. 2% of sodium silicate, and diphenyl guanidine in the proportion of 20 to 60 parts per million calculated on the weight of the percarbonate which could theoretically be produced. During the addition the temperature of the solution is kept between, say, 5° C. and 10° C., by cooling to remove the heat of formation of the percarbonate. As reaction proceeds, percarbonate will be precipitated, and this separation of percarbonate is subsequently made as complete as possible by saturating the solution with sodium chloride. The precipitated percarbonate is then separated by means of a centrifuge, or otherwise, and dried, e. g. in a rotary drier.

Instead of adding hydrogen peroxide to the carbonate solution, sodium peroxide dissolved in water containing the diphenyl guanidine and the soduim silicate may be neutralised with hydrochloric acid of such strength that the neutralised solution is almost saturated with respect to sodium chloride. The percarbonate can then be formed and precipitated simultaneously by adding sodium carbonate to the solution with cooling. In this process the diphenyl guanidine may be added after all the carbonate or bicarbonate, but before the percarbonate is salted out. However, it is preferable to add it to the peroxide-containing liquor so that both the reaction and the precipitation are carried out in the presence of the diphenyl guanidine.

The following example illustrates but does not limit the invention, all parts being parts by weight.

*Example*

16 parts of hydrated magnesium sulphate and 35 parts of sodium silicate (70% $Na_2O.3.4SiO_2$) were dissolved in 1550 parts of water and 0.03 part of diphenyl guanidine was then added also and dissolved. 465 parts of 95% sodium peroxide and 1190 parts of 36% aqueous hydrochloric acid were than added slowly and simultaneously with cooling so as to maintain the temperature of the liquid substantially at 15° C. 450 parts of soda ash were next added gradually with cooling so that the temperature was maintained between 20° C. and 25° C. Sodium percarbonate was thereby precipitated, and after cooling to 15° C. the slurry was centrifuged and the moist centrifuged material dried in a rotary drier. 563 parts of product were thus obtained.

Calculated on the available oxygen content of the product before and after drying the drying efficiency was 93.5%.

In a similar run carried out omitting the diphenyl guanidine 444 parts of product were obtained, and the drying efficiency was 84.6%.

I claim:

1. In a process for the production of an alkali metal percarbonate by interacting in cold aqueous solution hydrogen peroxide and an alkali metal salt of the class consisting of the carbonate and the bicarbonate so as to form alkali metal percarbonate and causing alkali metal percarbonate to be precipitated from the solution, the step which comprises effecting the said precipitation in the presence of a small proportion of diphenyl guanidine.

2. A process according to claim 1 in which the solution from which the alkali metal percarbonate is precipitated also contains a stabiliser for alkali metal percarbonates, other than diphenyl guanidine.

3. A process according to claim 1 in which the solution from which the alkali metal percarbonate is precipitated also contains, in an effective proportion, a stabiliser for alkali metal percarbonates selected from the class consisting of gum arabic, sodium silicate, and water-soluble magnesium salts.

4. In a process for the production of an alkali metal percarbonate by interacting in cold aqueoous solution hydrogen peroxide and an alkali metal salt of the class consisting of the carbonate and the bicarbonate so as to form alkali metal percarbonate and causing alkali metal percarbonate to be precipitated from the solution, the step which comprises effecting the said precipitation in the presence of diphenyl guanidine in amount between 20 and 60 parts per million parts of percarbonate which could be produced.

5. A process according to claim 4 in which the solution from which the alkali metal percarbonate is precipitated also contains a stabiliser for alkali metal percarbonates, other than diphenyl guanidine.

6. A process according to claim 4 in which the solution from which the alkali metal percarbonate is precipitated also contains, in an effective proportion, a stabiliser for alkali metal percarbonates selected from the class consisting of gum arabic, sodium silicate, and water-soluble magnesium salts.

7. In a process for the production of an alkali metal percarbonate by interacting in cold aqueous solution hydrogen peroxide and an alkali metal salt of the class consisting of the carbonate and the bicarbonate so as to form alkali metal percarbonate and causing alkali metal percarbonate to be precipitated from the solution, the steps which comprise effecting the said precipitation in the presence of a small proportion of diphenyl guanidine, separating the precipitated alkali metal percarbonate from the reaction liquor, and drying the separated product.

8. A process according to claim 7 in which the solution from which the alkali metal percarbonate is precipitated also contains a stabiliser for alkali metal percarbonates, other than diphenyl guanidine.

9. A process according to claim 7 in which the solution from which the alkali metal percarbonate is precipitated also contains, in an effective proportion, a stabiliser for alkali metal percarbonate selected from the class consisting of gum arabic, sodium silicate, and water-soluble magnesium salts.

10. In a process for the production of an alkali metal percarbonate by interacting in cold aqueous solution hydrogen peroxide and an alkali metal salt of the class consisting of the carbonate and the bicarbonate so as to form alkali metal percarbonate and causing alkali metal percarbonate to be precipitated from the solution, the steps which comprise effecting the said precipitation in the presence of an amount of diphenyl guanidine between 20 and 60 parts per million parts of percarbonate which could be produced, separating the precipitated alkali metal percarbonate from the reaction liquor, and drying the separated product.

11. A process according to claim 10 in which the solution from which the alkali metal percarbonate is precipitated also contains a stabiliser for alkali metal percarbonates, other than diphenyl guanidine.

12. A process according to claim 10 in which the solution from which the alkali metal percarbonate is precipitated also contains, in an effective proportion, a stabiliser for alkali metal percarbonates selected from the class consisting of gum arabic, sodium silicate, and water-soluble magnesium salts.

13. A process for the production of an alkali metal percarbonate which comprises adding an alkali metal salt selected from the class consisting of the carbonate and the bicarbonate to cold aqueous hydrogen peroxide containing a small proportion of diphenyl guanidine, subsequently adding the chloride of the corresponding alkali metal to the resultant liquor so as to salt out alkali metal percarbonate, separating the precipitated alkali metal percarbonate from the mother liquor, and drying the alkali metal percarbonate.

14. A process according to claim 13 in which the cold aqueous hydrogen peroxide also contains a stabiliser for alkali metal percarbonate other than diphenyl guanidine.

15. A process according to claim 13 in which the cold aqueous hydrogen peroxide also contains, in an effective proportion, a stabiliser for alkali metal percarbonate selected from the class consisting of gum arabic, sodium silicate, and water-soluble magnesium salts.

16. A process for the production of an alkali metal percarbonate which comprises neutralising an aqueous solution of alkali metal peroxide containing a small proportion of diphenyl guanidine with aqueous hydrochloric acid so as to produce a solution almost saturated in the cold with respect to the alkali metal chloride formed, adding to the resultant solution, in the cold, a salt of the corresponding alkali metal selected from the class consisting of the carbonate and the bicarbonate whereby alkali metal percarbonate is formed and precipitated, separating the precipitated percarbonate from the mother liquor, and drying it.

17. A process according to claim 16 in which the cold aqueous hydrogen peroxide also contains a stabiliser for alkali metal percarbonates other than diphenyl guanidine.

18. A process according to claim 16 in which the cold aqueous hydrogen peroxide also contains, in an effective proportion, a stabiliser for alkali metal percarbonate selected from the class consisting of gum arabic, sodium silicate, and water-soluble magnesium salts.

19. A process for the production of sodium percarbonate which comprises adding a sodium salt selected from the class consisting of the carbonate and the bicarbonate to cold aqueous hydrogen peroxide containing a small proportion of diphenyl guanidine, subsequently adding sodium chloride to the resultant liquor so as to salt out sodium percarbonate, separating the precipitated sodium percarbonate from the mother liquor, and drying the sodium percarbonate.

20. A process for the production of sodium percarbonate which comprises neutralising an aqueous solution of sodium peroxide containing a small proportion of diphenyl guanidine with aqueous hydrochloric acid so as to produce a solution almost saturated in the cold with respect to the sodium chloride formed, adding to the resultant solution, in the cold, a sodium salt selected from the class consisting of the carbonate and the bicarbonate whereby sodium percarbonate is formed and precipitated, separating the precipitated percarbonate from the mother liquor, and drying it.

OSWALD HUGH WALTERS.